United States Patent [19]

Hamabe et al.

[11] Patent Number: 5,350,450
[45] Date of Patent: Sep. 27, 1994

[54] ADMIXTURE FOR CONCRETE MIXES

[75] Inventors: Kenkichi Hamabe, Samukawa; Shigemi Matsuo; Hiroshi Nomachi, both of Chigasaki; Hideo Ogawa, Sagamihara; Minoru Ueda, Samukawa, all of Japan

[73] Assignee: Sandoz Ltd., Basel, Switzerland

[21] Appl. No.: 56,154

[22] Filed: Apr. 30, 1993

Related U.S. Application Data

[63] Continuation of Ser. No. 967,951, Oct. 27, 1992, abandoned, which is a continuation of Ser. No. 533,256, Jun. 4, 1990, abandoned.

[30] Foreign Application Priority Data

Jun. 5, 1989 [JP] Japan .................................. 1-142585

[51] Int. Cl.$^5$ ............................................. C04B 24/00
[52] U.S. Cl. .................................... 106/802; 106/804; 106/810; 106/819; 106/823; 427/372.2; 427/427
[58] Field of Search ............... 106/802, 804, 810, 819, 106/823; 427/372.2, 427

[56] References Cited

U.S. PATENT DOCUMENTS 4,082,561  4/1978  Nakagawa et al. ................. 106/819
4,655,838  4/1987  Koga et al. ............................. 524/5
4,963,190  10/1990  Mizunuma et al. ................. 106/823

FOREIGN PATENT DOCUMENTS 107086      5/1984  European Pat. Off. .
54-017918   2/1979  Japan .
58-015054   1/1983  Japan .
58-135165   8/1983  Japan .
58-135166   8/1983  Japan .

OTHER PUBLICATIONS

Chemical Abstract No. 106:54900u, H. Sumino, "Cement Admixtures for Improving Workability and Strength", 1987.
Chemical Abstract No. 106:54899a, H. Sumino, "Cement Admixtures for Improviing Workability and Strength", 1987.
Chemical Abstract No. 106:54897y, H. Sumino, "Cement Admixtures for Improving Workability and Strength", 1987.
Chemical Abstract No. 112(2):11233k, O. Imamura, "Cement Suspension Compositions with Controlled Gelling ime", 1989.

*Primary Examiner*—Anthony Green
*Attorney, Agent, or Firm*—Robert S. Honor; Richard E. Vila; Carol A. Loeschorn

[57] ABSTRACT

A method for applying a cementitious composition to a surface comprising
1) adding to the cementitious composition
   a) a set retarding agent;
   b) a cement quick-setting agent;
   c) a cement dispersing agent;
   d) a slow release dispersing agent, that hydrolyzes under alkaline conditions to form a dispersing agent; and
2) applying the concrete to a surface while the concrete is fluid.

15 Claims, No Drawings

ADMIXTURE FOR CONCRETE MIXES

This is a continuation of application Ser. No. 07/967,951, filed Oct. 27, 1992 now abandoned, which in turn is a continuation of application Ser. No. 07/533,256, filed Jun. 4, 1990, now abandoned.

The invention relates to a method for rapid setting and hardening of concrete. This can be used for manufacturing concrete used in the lining of excavated surfaces of construction tunnels or underground caverns, and in the manufacturing of easily strippable concrete or in the manufacturing of concrete for use immediately after application, by the floating press-on, pneumatic application or pouring method.

In the construction of tunnels and underground caverns, shotcreting methods, in which cement quick-setting agents are added, have conventionally been employed for applying concrete to line the excavated surfaces.

These shotcreting methods may be broadly divided into dry-mix spraying processes and wet-mix spraying processes.

A dry mix spraying process is a method which comprises delivering concrete which is dry-mixed (without any water) into a conveying pipe, conveying the dry mix pneumatically, adding water in the vicinity of the nozzle outlet, and spraying the wet concrete from the nozzle outlet onto the requisite surface.

A wet-mix spraying process, however comprises delivering fresh wet concrete into a conveying pipe, conveying the concrete pneumatically and spraying from the nozzle outlet onto the requisite surface.

In dry-mix spraying and wet-mix spraying conveying may also be in part carried out by pumping, with the rest being performed, pneumatically followed by spraying from the nozzle outlet.

In such methods, addition of the cement quick-setting agent in case of a dry-mix process, is done at the time of dry-mixing of concrete or in the vicinity of the nozzle outlet, whereas in case of a wet-mix process, the addition of the cement quick-setting agent occurs only at the vicinity of the nozzle outlet.

In these shotcreting methods, much dust results from forceful spraying of the concrete onto the excavated surface by compressed air and this is not good for the work environment. Further there are also losses in material due to rebound of the concrete.

In order to resolve some of these problems of shotcreting various methods have been developed which are known as the floating, press-on, pneumatic application and pouring methods.

These methods comprise pouring fresh concrete at low pressure underground between ground level and the mobile forms, allowing hardening of the concrete, removing the mobile forms thereby forming the primary lining through repetitions of this operation. The concrete used in such construction methods needs to possess fluidity, and in addition, have quick-setting properties.

In order to pour fresh concrete underground between the ground (i.e. a cavern or tunnel wall) and the mobile forms, the concrete must retain fluidity of a high degree while being poured in to the form to fill all corners completely, whilst on the other hand after completion of pouring, it needs to harden as rapidly as possible so that the mobile forms can be removed to be taken to the next position as quickly as possible for fresh concrete to be applied at that position. In this way the operations can be carried out efficiently.

In shotcreting, when using a conventional cement quick-setting agent, the concrete sets rapidly and hardens almost immediately after it has been sprayed onto the excavated surface. When preparing a cement-based slurry mixture, a cement quick-setting agent is added to cement, mortar or concrete.

A method, using a set-retarding agent in combination with a cement quick-setting agent, is known to control the setting and hardening times in construction.

However, when the floating method is used, fluidity of the concrete is rapidly lost upon the addition of the cement quick-setting agent. To avoid this happening too quickly, set-retarding agents are used to maintain fluidity. These cause setting and hardening to be delayed, and this causes difficulties in the concrete setting and hardening within a reasonable length of time.

Consequently, merely combining a cement quick-setting agent and a set-retarding agent in such processes causes difficulties in allowing the concrete to retain fluidity for a required period of time and subsequently allowing a quick setting and hardening.

This is an aim of this invention to provide a method for rapid setting and hardening of concrete which, after adding a quick-setting cement agent, retains the fluidity of concrete for several minutes, after which setting and hardening progresses rapidly and strength is gained.

The inventors have found a method, where for several minutes after addition of cement quick-setting agent, the concrete maintains fluidity to the degree that filling the interior of a mobile form will be possible, and subsequently, quick-setting occurs to a degree that the form can be removed (stripped) in about 15 minutes.

According to the invention there is provided a method for applying a cementitious composition (preferably concrete, cement paste or mortar) to a surface comprising
1) adding to the cementitious composition
   a) a set retarding agent;
   b) a cement quick-setting agent
   c) a cement dispersing agent; and
   d) a slow release dispersing agent, that hydrolyzes under alkaline conditions to form a dispersing agent; and
2) applying the concrete to a surface while the concrete is fluid.

After application of the concrete, setting and hardening rapidly occur.

Further according to the invention, there is provided a composition comprising
   a) a set retarding agent
   b) a cement quick-setting agent
   c) a cement dispersing agent; and
   d) a slow release cement dispersing agent that hydrolyses under alkaline conditions to form a dispersing agent.

A preferred composition according to the invention comprises
   a) 0.001 to 5.0 % of a set-retarding agent
   b) 1.0 to 10 % of a cement quick-setting agent
   c) 0.01 to 2 % of a cement dispersing agent
   d) 0.01 to 0.2 % of a slow-release cement dispersing agent.

Preferably such a composition may also include a cemetitious composition.

This method according to the invention for rapid setting and hardening of concrete, can be used in a floating, press-on, pneumatic placement or pouring method to replace shotcreting for lining excavated surfaces in construction, for instance, of tunnels and, or in concrete work where immediate stripping of forms is required, or in concrete used immediately after placement.

Slow release cement dispersing agents used in a method or composition according to the invention, are substances which gradually hydrolyze under alkaline conditions (of around pH 12.5) whereby the product of hydrolysis forms a cement dispersing agent. Such slow release cement dispersing agents are preferably selected from a copolymer of styrene and anhydrous maleic acid and a water-insoluble metal complex thereof; a copolymer of an olefin having 2 to 8 carbon atoms and a ethylenically unsaturated dicarboxylic acid anhydride and a water-insoluble metal complex thereof.

Preferably the cement quick-setting agent used in a method or composition according to the invention is selected from carbonates of alkali metals or alkaline earth metals, aluminates of alkali metals or alkaline earth metals, calcined alum, and calcium aluminate. Preferably a 5-percent by weight aqueous solution of said quick-setting agent has a alkalinity of not less that pH 13.

Preferably a cement dispersing agent used in a method or composition according to the invention is selected from the condensation product of naphthalene sulphonic acid and formaldehyde, the condensation product of melamine sulphonic acid and formaldehyde, a polycarboxylate, a lignosulfonate, an oxycarboxylate and a glucosaccharide.

Preferably a set retarding agent used in a method or composition according to the invention is selected from saccharides, oxycarboxylates, lignosulfonates, celluloses, phosphates, fluorides, zinc oxides and lead oxides;

Preferably the cement quick-setting agent and the set-retarding agent are added in combination to fresh cemetitious composition (preferably concrete) containing the cement dispersing agent and the slow release cement dispersing agent prior to application of the concrete. Preferably the ratio of set-retarding agent to cement quick-setting agent is 0.1 to 1.0%.

Such cementitious compositions (preferably concrete) retains high fluidity for about several minutes after addition of quick-setting agent without greatly affecting the quick-setting properties.

The pH of fresh concrete is normally about 12.5 and the slow-release cement dispersing agent is gradually subjected to hydrolysis under alkaline conditions of this degree.

By the addition of a cement quick-setting agent, which is highly alkaline, the pH of the fresh concrete is raised further compared with a case where no cement quick-setting agent is added. It is believed that the invention functions as follows.

In an environment where the pH increased suddenly, albeit temporarily, through the addition of cement quick-setting agent, the rate of hydrolysis of the cement dispersing agent is greatly increased and a hydrolysis product, possessing cement dispersing properties is formed in a short period of time. It is through the cement dispersing property of that hydrolysis product that the reduction in fluidity due to addition of the cement quick-setting agent is offset and so it becomes possible for the fluidity of the concrete to be maintained for the required length of time.

Adding the slow release cement dispersing agent can be carried out either as a single addition or as an addition of a preblended composition with another cement dispersing agent, which other dispersing agent can be one that can be used for the purpose of imparting the necessary consistency to concrete.

The slow release cement dispersing agent or blend must be added prior to addition of the, cement quick-setting agent, in which case it may be prior to or subsequent to addition of the dispersing agent. However it may be added subsequent to addition of the set-retarding agent. Preferably the dosage of slow-release cement dispersing agent is 0.5 to 200 %.

Preferably the amount of quick-setting agent used in a method according to the invention is in a range of 1 to 10 percent by weight of cement and the amount of set-retarding agent used in a process according to the invention in a range of 0.001 to 5.0 percent by weight when adding the previous cement quick-setting agent and set-retarding agent. Such a mixture results in a good fluidity in the concrete for a number of minutes after addition of the cement quick-setting agent, and moreover, setting and hardening can be seen to take effect after a suitable lapse of time.

If the dosage of set-retarding agent is less than 0.001 percent by weight, it becomes difficult to maintain the required fluidity after addition of the cement quick-setting agent and the set-retarding agent in combination, without significantly increasing the dosage of the cement dispersing agent and this would result in poor economy.

Further, when the dosage of set-retarding agent is over 5.0 percent by weight, although the fluidity of the concrete would not be affected, setting and hardening would be markedly retarded, and it would be difficult to cause the concrete to set and harden within 15 minutes after combined addition of cement quick-setting agent and set retarding agent.

It has also been found that concrete applied by a method according to the invention has adequate strength to be used as structural concrete.

It goes without saying that, in a method according to the invention, the dosages and combinations of cement dispersing agent, slow release cement dispersing agent, set-retarding agent and cement quick-setting agent may be selected based on the following factors. Firstly, on the time desired for fluidity to be maintained after spraying and, secondly, depending on the object of construction and other such factors.

Further according to the invention here is provided a mixture of
1) a cement dispersing agent, preferably selected from the condensation product of naphthalene sulphonic acid and formaldehyde, the condensation product of melamine sulphonic acid and formaldehyde, a polycarboxylate, a lignosulfonate, an oxycarboxylate and a glucosaccharide; and
2) a slow release cement dispersing agent which gradually hydrolyses under alkaline conditions whereby the hydrolytic product is a cement dispersing agent, preferably selected from a copolymer of styrene and anhydrous maleic acid and a water insoluble metal complex thereof; and a copolymer of an olefin having 2 to 8 carbon atoms and an ethylenically unsaturated dicarboxylic acid anhydride and a water insoluble metal complex thereof. Preferably the ratio of cement dispersing agent to slow-release cement dispersing agent is 0.5 to 200%.

The invention will now be illustrated by the following examples:

EXAMPLES 1–8

(1) The materials used are as follows:

a) Cement:

Equal quantities of ordinary portland cements manufactured by the Onoda, Mitsubishi and Sumitomo firms blended are used.

b) Coarse Aggregate:

Crushed stone of graywacke from Ohme used (specific gravity=2.6, absorption=0.67 percent, F.M.=6.35 maximum size=15 mm).

c) Fine Aggregate:

Oi River System pit sand and Chiba Prefecture pit sand blended and used (specific gravity=2.65, absorption=1.34 percent, F.M.=2.69).

d) Cement Dispersing Agent:

The calcium salt of the condensate of naphthalene sulfonic acid and formaldehyde (commercially available as Rheobild 1000.

e) Slow Release Agent:

The Copolymer of an olefin having 2 to 8 carbon atoms and an ethylenic unsaturated dicarboxylic acid anhydride. Commercial name: Isoban 600 (mfd. by Kuraray Co. ,Ltd. )

f) Cement Quick-setting Agent:

Inorganic aluminate compound base Commercial name: Potassium aluminate (mfd. by Sumitomo Refining Co., Ltd.)

g) Set-retarding Agent:
Sodium gluconate
Reagent first grade (mfd. by Wako Junyaku Co., Ltd.)

2) Concrete is mixed together as shown in Table 1.

3) Testing

The components of the concrete given in Table 1 without the cement quick-setting agent and set-retarding agent are mixed together and the slump of the resulting concrete mixture is measured. After standing for 30 minutes, the entire mix is returned to the mixer. The cement quick-setting agent and set-retarding agent are then added in combination, and mixing is resumed for 20 seconds.

The slump and initial setting time of the so formed concrete are measured. Measurement of final setting time is performed in accordance with JIS A 6204.

4) Test Results:

The test results are given in Table 2.

TABLE 2

| | | | | Test Results | | |
|---|---|---|---|---|---|---|
| Test No. | Example/ Comparison | Slump 0 Min. after Mixing | After 30 Min. at Rest | 2 Min. after Adding Quick-setter & Set-retarder | Initial Set *1 (min-sec) | Compressive Strength (kgf/cm$^2$) Age 2 days |
| 1 | Comparison | 20.0 | 17.5 | 10.5 | over 60 min | 260 |
| 2 | Comparison | 20.5 | 16.0 | 12.5 | 19-00 | 290 |
| 3 | Comparison | 20.5 | 16.0 | 15.5 | over 60 min | 310 |
| 4 | Comparison | 20.5 | 19.0 | 3.0 | 8-00 | 283 |
| 5 | Example | 20.0 | 18.5 | 15.5 | 10-00 | 285 |
| 6 | Example | 20.5 | 19.0 | 17.5 | 12-00 | 289 |
| 7 | Example | 20.0 | 19.0 | 18.5 | 15-00 | 306 |
| 8 | Example | 20.5 | 18.5 | 19.0 | 22-00 | 320 |

*1 Time elapsed after simultaneous addition of cement quick-setting agent and set-retarding agent.

From Table 2 the following can be seen.

1. Examples 1 to 3 are tests in which the slow release cement dispersing agent is not present and the concrete so produced has a slump immediately after mixing of 20 cms (+/−1 cm). The values of slump after the combined addition of cement quick-setting agent and set-retarding agent are reduced to below 15 cm but there was inadequate fluidity.

2. In Example 3, the cement quick-setting agent remains the same as for Examples 1 and 2 while the quantity of the set-retarding agent is increased and although good fluidity after addition of cement quick-setting agent and set-retarding agent could be achieved, more that 60 minutes were required until initial set started. It was not possible for the concrete to be made to set and harden within about 15–25 minutes after addition of the cement quick-setting agent and set-retarding agent.

3. Example 4 shows a concrete in which no retarding agent is added and only cement quick-setting agent is added to concrete mixed using a cement dispersing agent and slow release dispersing agent. In this case it is not possible to achieve adequate fluidity after addition of the cement quick-setting agent.

TABLE 1

| | | Mix Proportions of Concrete | | | | | | | |
|---|---|---|---|---|---|---|---|---|---|
| Example No. | Example/ Comparison | Cement Dispers. Agent Dosage *1 | Slow Release Cement Dispers. Agent Dosage *1 | Cement Quick-setting Agent Dosage *1 | Set-retarding Agent Dosage *1 | Mix Proportions of Concrete (kg/m$^3$) | | | |
| | | | | | | Cement | Water | Fine Agg. | Coarse Agg. |
| 1 | Comparison | — | — | 3.68 | 0.02 | 360 | 320 | 889 | 757 |
| 2 | Comparison | 0.3 | — | 3.68 | 0.02 | 360 | 180 | 946 | 806 |
| 3 | Comparison | 0.3 | — | 3.68 | 0.08 | 360 | 180 | 946 | 806 |
| 4 | Comparison | 0.3 | 0.03 | 3.68 | — | 360 | 180 | 946 | 806 |
| 5 | Example 5 | 0.3 | 0.03 | 3.68 | 0.004 | 360 | 180 | 946 | 806 |
| 6 | Example 6 | 0.3 | 0.03 | 3.68 | 0.008 | 360 | 180 | 946 | 806 |
| 7 | Example 7 | 0.3 | 0.03 | 3.68 | 0.02 | 360 | 180 | 946 | 806 |
| 8 | Example 8 | 0.3 | 0.03 | 3.68 | 0.04 | 360 | 180 | 946 | 806 |

Notes)
*1 All dosages are based on solids and are percentages by weight of cement.
Commercial names of additives: Rheobild 1000 (cement dispersing or water-reducing agent), Isoban 600 (slow release cement dispersing agent), Potassium aluminate (cement quick-setting agent), Sodium gluconate (set-retarding agent)

4. Examples 5 to 8 show the result of adding cement quick-setting agent and set-retarding agent, varying their dosages to the concrete to which a cement dispersing agent and a slow release cement dispersing agent have been added.

In Examples 5,6,7 and 8 the dosage of the cement quick-setting agent is constant and the dosage of set-retarding agent is varied: 0.004, 0.008, 0.02 and 0.04 percent by weight of cement.

The concrete, after addition of the cement quick-setting agent and the set-retarding agent, retains fluidity and when set-retarding agent are added in a range of 0.004 to 0.02 percent by weight, the setting and hardening are attained in a short period of time not more than 15 minutes while maintaining good fluidity of concrete up till then. In case of Example 8, the concrete, after addition of the cement quick-setting agent and the set-retarding agent, retains fluidity although the initial time of setting is 22 minutes.

Furthermore, adequate strength for structural concrete results in Examples 5 to 8.

We claim:

1. A method for applying a cementitious composition to a surface comprising:
   1) creating a fluid composition which comprises the cementitious composition, plus
      a) 0.001 to 5.0% of a set retarding agent;
      b) 1.0 to 10% of a cement quick-setting agent;
      c) 0.01 to 2% of a cement dispersing agent;
      d) 0.01 to 0.2% of a slow release cement dispersing agent; and
   2) applying the fluid composition to a surface while the fluid composition remains fluid.

2. A method according to claim 1 in which the cement quick-setting agent and the set-retarding agent are added in combination to a cementitious composition containing the cement dispersing agent and the slow release cement dispersing agent prior to application of the fluid composition.

3. A method according to claim 1 in which the cementitious composition has a pH of about 12.5.

4. A method according to claim 1 in which the slow release cement dispersing agent is a substance which gradually hydrolyses under alkaline conditions of about pH 12.5 to form a cement dispersing agent.

5. A method according to claim 1 in which the slow release cement dispersing agent is selected from the group consisting of a copolymer of styrene and anhydrous maleic acid, a water-insoluble metal complex thereof, a copolymer of an olefin having 2 to 8 carbon atoms and an ethylenically unsaturated dicarboxylic acid anhydride and a water-insoluble metal complex thereof.

6. A method according to claim 1 in which the cement quick-setting agent is selected from the group consisting of carbonates of alkali metals or alkaline earth metals, aluminates of alkali metals or alkaline earth metals and calcined alum.

7. A method according to claim 1 in which the cement dispersing agent is selected from the group consisting of naphthalene sulfonate-formaldehyde condensates, melamine sulfonate-formaldehyde condensates, a polycarboxylate, a lignosulfonate, an oxycarboxylate and a glucosaccharide.

8. A method according to claim 1 in which the set retarding agent is selected from the group consisting of saccharides, oxycarboxylates, lignosulfonates, celluloses, phosphates, fluorides, zinc oxides and lead oxides.

9. A composition comprising
   a) 0.001 to 5.0% of a set retarding agent;
   b) 1.0 to 10% of a cement quick-setting agent;
   c) 0.01 to 2% of a cement dispersing agent; and
   d) 0.01 to 0.2% of a slow release cement dispersing agent that hydrolyses under alkaline conditions to form a dispersing agent.

10. A composition according to claim 9 in which the composition includes a cementitious composition.

11. A composition according to claim 9 or 10 in which the slow release cement dispersing agent is a substance which gradually hydrolyses under alkaline conditions of about pH 12.5 to form a cement dispersing agent.

12. A composition according to claim 9 or 10 in which the slow release cement dispersing agent is selected from the group consisting of a copolymer of styrene and anhydrous maleic acid, a water-insoluble metal complex thereof, a copolymer of an olefin having 2 to 8 carbon atoms and a ethylenically unsaturated dicarboxylic acid anhydride and a water-insoluble metal complex thereof.

13. A composition according to claim 9 or 10 in which the cement quick-setting agent is selected from the group consisting of carbonates of alkali metals or alkaline earth metals, aluminates of alkali metals or alkaline earth metals and calcined alum.

14. A composition according to claim 9 or 10 in which the cement dispersing agent is selected from the group consisting of naphthalene sulfonate-formaldehyde condensates, a polycarboxylate, a lignosulfonate, an oxycarboxylate and a glucosaccharide.

15. A composition according to claim 9 or 10 in which the set retarding agent is selected from the group consisting of saccharides, oxycarboxylates, lignosulfonates, celluloses, phosphates, fluorides, zinc oxides and lead oxides.

* * * * *